United States Patent Office 3,466,588
Patented Sept. 9, 1969

3,466,588
ELECTRIC COUPLING DEVICE
John L. Bradshaw, Hillsdale, N.J., assignor to the United States of America as represented by the Secretary of the Air Force
Filed Jan. 25, 1968, Ser. No. 700,637
Int. Cl. H01r 39/64; H02g 11/00
U.S. Cl. 339—5                                    4 Claims

ABSTRACT OF THE DISCLOSURE

An electric coupling device having a fixed member and a rotatable member mounted therein. Operably associated with these members is a conducting means and a pulley arrangement. The unique relationship between the above elements permits continuous electrical contact between an electrical source and an oscillatory device which is fixedly secured to the rotatable member while allowing the rotatable member 330° of rotation in either direction.

Background of the invention

This invention relates generally to electric coupling devices and more particularly, to an electric coupling device having no sliding or rubbing contact and which is capable of 330° of rotation in either direction.

In the area of electrical coupling of oscillatory devices such as antennas or radar reflectors to an electrical source, it is necessary to provide an efficient coupling means between the electrical source and the oscillatory device. The construction of such an electrical coupling device presents serious problems of power transmitting efficiency, conductor and other component cost, wear and reliability where relative motion is involved between such components and conductors.

Prior art devices are not applicable whenever it is desirable to have continuous electrical contact between components which oscillate relative to each other for angular motions of more than 180° in either direction. For example, the use of brushes as the electrical coupling device has numerous disadvantages. It is difficult for these brushes to maintain continuous sliding contact since a sudden vibration may cause a break in contact. Furthermore, the conducting surfaces are subject to wear and contamination. Another disadvantage of this sort of design is the limited amount of power at which these couplings are operable. At high power, arcing and sparking may take place at the contact areas, thus destroying the electrical conductivity of the surface.

Summary of the invention

The electrical coupling device of this invention is not only capable of providing a continuous electrical contact between parts but is also capable of providing this continuous contact between parts which have an angular motion of more than ± 180°.

The electrical coupling device of the instant invention made up of a rotatable member, a fixed member and a conductor mounted therebetween. Because of the unique manner in which the conductor is mounted between the rotatable member and the fixed member an electrical source may continuously supply power to a utilizing or oscillatory device such as an antenna which is fixedly secured to the rotatable member. The only limitation on the rotatability of the rotatable member is that it is only capable of angular motion up to 330° in either direction. This is accomplished by clamping the adjacent ends of two conductor elements to the fixed member, extending each around the rotatable member, thence each around one of two joined pulleys, and back around the rotatable member to be clamped together to the rotatable member. A ring is fixed to the pulley assembly and spaces the portions of each element where they surround the rotatable member.

It is, therefore, an object of this invention to provide an electrical coupling device which provides continuous electrical contact with no sliding or rubbing contacts for angular motions of up to 330° in either direction.

It is a further object of this invention to provide an electrical coupling device which is insensitive to vibration.

It is another object of this invention to provide an electrical coupling device which has no exposed contacts and therefore is less likely to be subject to wear and contamination.

It is still a further object of this invention to provide an electrical coupling device which is economical to produce and which utilizes conventional, currently available components that lend themselves to standard and production manufacturing techniques.

For a better understanding of the present invention together with other and further objects thereof, reference is had to the following description taken in connection with the accompanying drawing.

Description of the invention

Figure 1:
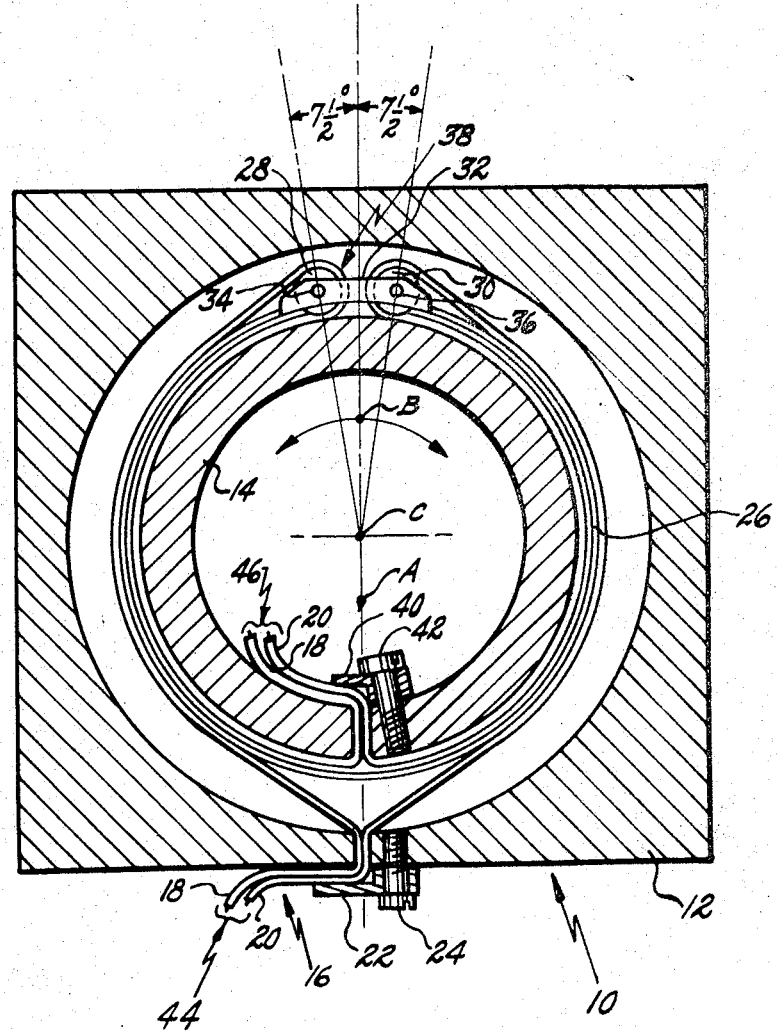
FIGURE 1 is a schematic representation of the electric coupling device of this invention in a starting position.

Referring now to FIGURE 1 of the accompanying drawing for a more complete understanding of the invention. The electrical coupling device 10 which constitutes this invention is made up of a fixed member 12 and a rotatable member 14. An electrical conducting means 16 made up of conducting strips 18 and 20 is clamped near one of its ends to fixed member 12. These conducting strips 18 and 20 are preferably of copper and are covered with an insulating material such as plastic or rubber. The conducting means 16, near its other end, is fixedly secured to the rotatable member. Thus it can be seen that by connecting one end of the conducting means 16 to an electrical source (not shown) and the other end to a utilization or oscillatory device (not shown) such as an antenna or radar reflector which is fixedly secured to the rotating member 14, the rotatable member 14 may be rotated up to 330° in either direction. Any suitable drive means (not shown) may be operably connected by any conventional connecting means to the rotatable member 14 for oscillating it and the utilization device ± 330°.

Figure 2:
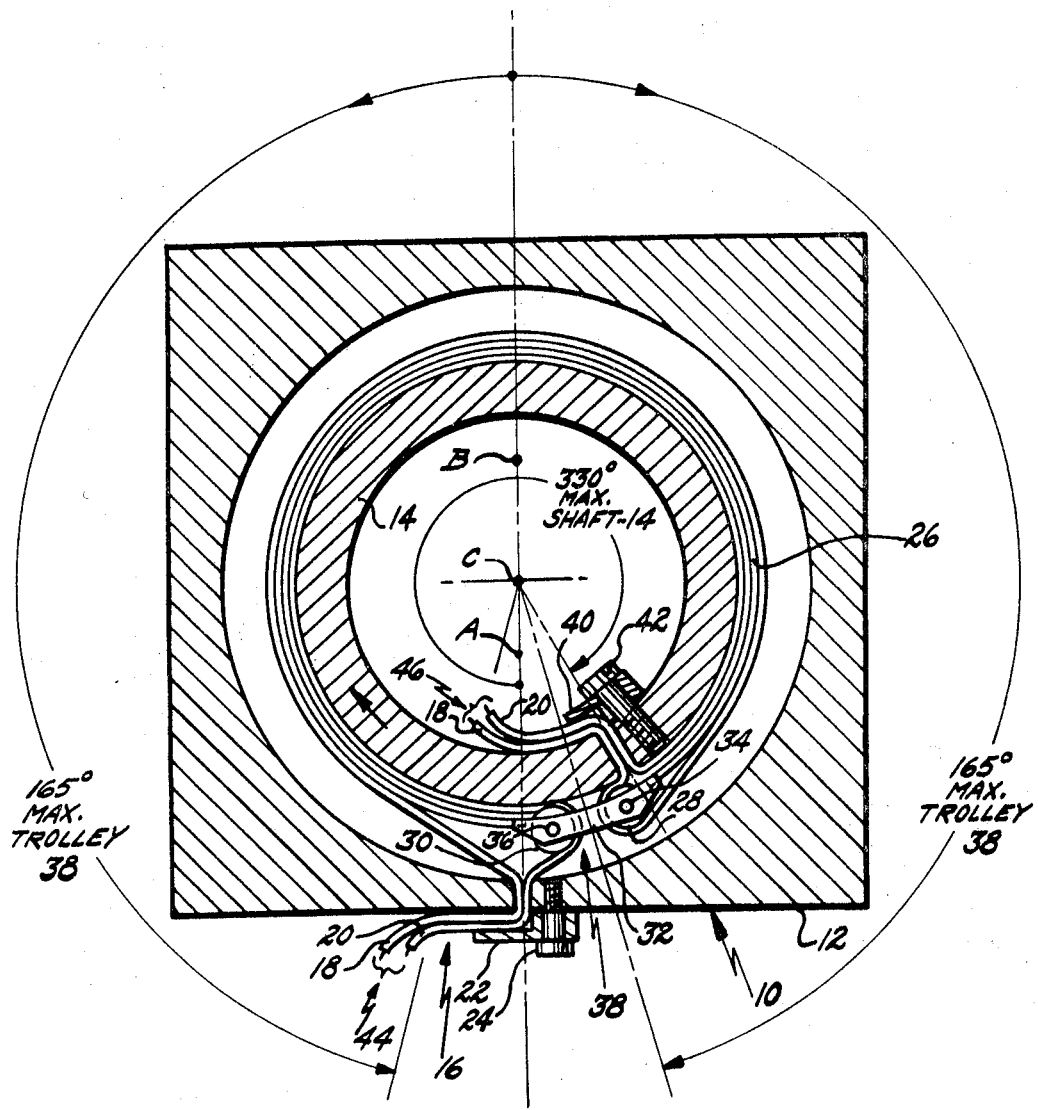
FIGURE 2 is a schematic representation of the electric coupling device of this invention rotated 330° clockwise of the position shown in FIGURE 1.

For a more detailed description of the invention, I refer now to FIGURES 1 and 2. FIGURE 1 shows the electric coupling device 10 of this invention in a first position and FIGURE 2 shows the coupling device 10 in a second position in which the rotatable member 14 has been rotated 330° in the clockwise direction.

The rotatable member 14 which is generally of a shaft-like configuration is rotatably mounted within fixed member 12 by a suitable holding means (not shown). Also not shown is a utilization or oscillatory device such as an antenna or radar reflector fixedly secured to the rotatable member 14 by any suitable fastening means such as welding. An electrical conducting means 16 having two conducting strips 18 and 20 is securely clamped near one of its ends 44 to the fixed member 12 by any suitable clamping means such as clamp 22 and bolt 24. Each conducting strip 18, 20 is looped around a spacer ring 26 and then around pulleys 28 and 30, respectively.

The pulleys 28 and 30 are rotatably held relative to one another by link 32 and pivot pins 34 and 36, respectively, forming a trolley or pulley arrangement 38. The trolley 38 is further held in position about rotatable member 14 by its link 32 securely fastened to ring 26. The conducting strips 18 and 20 are secured near their other ends 46 to rotatable member 14 by clamping them securely to the rotatable member 14 by any suitable clamping means such as clamp 40 and bolt 42. In order to transmit electrical power to a utilization or oscillatory device which is fixedly secured to rotatable member 14, one end 44 of the conducting means 16 is connected to a power source while the other end 46 of the conducting means 16 is connected to the utilization device.

By means of the above inventive concept, rotatable member 14 can be rotated 330° in either direction from a starting position A shown in FIGURE 1. As the rotatable member 14 is rotated 330° in the clockwise direction, for example, to the position shown in FIGURE 2, the trolley 38 with pulleys 28 and 30 is rotated from starting position B shown in FIGURE 1, 165° in the clockwise direction to the position shown in FIGURE 2. Although the dimensional relationship between the diameter of the pulleys 28 and 30 and the diameter of the rotatable member 14 is of no significance, it is critical that the center of each pulley be located 7½° on either side of a straight line drawn from the center of rotation C of rotatable member 14 to the midpoint of link 32.

Mode of operation

In operation, the electric coupling device of this invention provides a continuous electrical contact between a power source and a utilization device such as an antenna or radar reflector which oscillates more than 180° in either direction. There is no sliding or rubbing contact involved in the instant invention, therefore eliminating much of the prior art difficulties. One end 44 of the conducting means 16 is connected to a power source while the other end 46 of the conducting means 16 is connected to the utilization device, the utilization device being securely mounted on the rotatable member 14.

When it is desired to oscillate the utilization device, a conventional oscillating drive means, which is operably connected to the rotatable member 14, is activated. It can be seen that because of the inventive concept hereinbefore described the rotatable member 14 is capable of 330° rotation in either direction from starting point A (shown in FIGURE 1) while the trolley or pulley arrangement 38 produces 165° of rotation in either direction. The coupling device, therefore, rotates between a position 330° clockwise of the starting position A (see FIGURE 2 to a position 330° counterclockwise (not shown) of the starting position A. There is continuous electrical contact with the instant electric coupling device because at all times the power source is directly connected to the utilization device by means of conducting means 16.

Although the invention has been described with reference to a particular embodiment, it will be understood to those skilled in the art that the invention is capable of a variety of alternate embodiments within the spirit and scope of the disclosed invention.

I claim:

1. An electric coupling device comprising an outer fixed member, a rotatable member mounted within said fixed member, a conducting means having two ends, said conducting means being clamped near one of its ends to said fixed member and being clamped near the other of its ends to said rotatable member, a pulley arrangement being operably associated with said rotatable member and said conducting means being looped about said pulley arrangement in such a manner that 330° rotation of said rotatable member produces 165° rotation of said pulley arrangement.

2. An electric coupling device as defined in claim 1 wherein said conducting means comprises two conducting trips and said pulley arrangement comprises two pulleys and a link therebetween, one of said conducting strips being looped about one of said pulleys while the other of said conducting strips being looped about the other of said pulleys.

3. An electric coupling device as defined in claim 2 wherein a spacer ring is fixedly secured to said link and said ring is located intermediate said rotatable and fixed members.

4. An electric coupling device as defined in claim 3 wherein the center of each of said pulleys is located 7½° on either side of a straight line drawn from the center of rotation of said rotatable member to the midpoint of said link.

References Cited

UNITED STATES PATENTS

| 1,247,357 | 11/1917 | Young | 339—3 |
| 1,322,407 | 11/1919 | Chegwidden et al. | 191—12 |
| 3,311,860 | 3/1967 | Frank | 339—2 X |

FOREIGN PATENTS 434,274  4/1948  Italy.

RICHARD E. MOORE, Primary Examiner

U.S. Cl. X.R.

191—12.2